(12) United States Patent
Goldberg et al.

(10) Patent No.: US 7,280,986 B2
(45) Date of Patent: Oct. 9, 2007

(54) METHODS AND PROGRAM PRODUCTS FOR OPTIMIZING PROBLEM CLUSTERING

(75) Inventors: David E. Goldberg, Champaign, IL (US); Tian-Li Yu, Urbana, IL (US); Ali Yassine, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 789 days.

(21) Appl. No.: 10/774,676

(22) Filed: Feb. 9, 2004

(65) Prior Publication Data

US 2005/0177351 A1 Aug. 11, 2005

(51) Int. Cl.
*G06F 15/18* (2006.01)
*G06N 3/00* (2006.01)
*G06N 3/12* (2006.01)

(52) U.S. Cl. .................................. 706/13
(58) Field of Classification Search .............. 706/13
See application file for complete search history.

(56) References Cited

U.S. PATENT DOCUMENTS

| | | | |
|---|---|---|---|
| 5,930,762 A | 7/1999 | Masch | 705/7 |
| 5,940,816 A | 8/1999 | Fuhrer et al. | 706/13 |
| 5,963,902 A | 10/1999 | Wang | 704/243 |
| 6,490,572 B2 | 12/2002 | Akkiraju et al. | 706/19 |
| 6,615,205 B1 | 9/2003 | Cereghini et al. | 707/3 |
| 6,768,973 B1 | 7/2004 | Patel | 703/2 |
| 7,047,169 B2 * | 5/2006 | Pelikan et al. | 703/2 |
| 2003/0055614 A1 | 3/2003 | Pelikan et al. | 703/2 |
| 2005/0256684 A1 | 11/2005 | Jin et al. | 709/2 |

OTHER PUBLICATIONS

Optimization on Design Structure Matrix Method and its Application for Shipbuilding Planning Linyi Deng; Yan Lin; Chaoguang Jin; Ming Chen; Qianwen You; Intelligent Control and Automation, 2006. WCICA 2006. The Sixth World Congress on vol. 2, Jun. 21-23, 2006 pp. 7395-7399 Digital Object Identifier 10.1109/WCICA.2006.1714523.*

A simulation-based optimization framework for product development cycle time reduction Abdelsalam, H.M.E.; Bao, H.P.; Engineering Management, IEEE Transactions on vol. 53, Issue 1, Feb. 2006 pp. 69-85 Digital Object Identifier 10.1109/TEM.2005.861805.*

Enterprise Knowledge Based Database for New Product Development process K. M. Tham; S. A. Sharif; B. Kayis; Management of Innovation and Technology, 2006 IEEE International Conference on vol. 1, Jun. 2006 pp. 427-431 Digital Object Identifier 10.1109/ICMIT.2006.262198.*

(Continued)

*Primary Examiner*—Anthony Knight
*Assistant Examiner*—Michael B. Holmes
(74) *Attorney, Agent, or Firm*—Greer, Burns & Crain, Ltd.

(57) ABSTRACT

Exemplary embodiments of the present invention are directed to methods and program products for optimizing clustering of a design structure matrix. An embodiment of the present invention includes the steps of using a genetic operator to achieve an optimal clustering of a design structure matrix model. Other exemplary embodiments of the invention leverage the optimal clustering by applying a genetic operator on a module-specific basis.

28 Claims, 8 Drawing Sheets

OTHER PUBLICATIONS

Application of DSM-based process reengineering in multidisciplinary cooperative design Lu-ning Xu; He-ming Zhang; Wen-sheng Xu; Yong-kang Zhang; Computer Supported Cooperative Work in Design, 2005. Proceedings of the Ninth International Conference on vol. 2, May 24-26, 2005 pp. 961-965 vol. 2.*

Product development process intelligent analysis and improvement Yao Yong; Xiong Guangleng; Fan Wenhui; Fan Xiaodong; Networking, Sensing and Control, 2004 IEEE International Conference on vol. 1, Mar. 21-23, 2004 pp. 412-417 vol. 1 Digital Object Identifier 10.1109/ICNSC.2004.1297473.*

Mapping product innovation profile to product development activities—the I-DSM tool Bilalis, N.; Maravelakis, E.; Antoniadis, A.; Moustakis, V.; Engineering Management Conference, 2004. Proceedings. 2004 IEEE International vol. 3, Oct. 18-21, 2004 pp. 1018-1022 vol. 3 Digital Object Identifier 10.1109/IEMC.2004.1408845.*

Managing unmanned flight projects using methods in complex product development Mohan, S.N.; Aerospace Conference Proceedings, 2002. IEEE vol. 7, Mar. 9-16, 2002 pp. 7-3473-7-3488 vol. 7 Digital Object Identifier 10.1109/AERO.2002.1035324.*

Product development process capture and display using Web-based technologies Sabbaghian, N.; Eppinger, S.; Murman, E.; Systems, Man, and Cybernetics, 1998. 1998 IEEE International Conference on vol. 3, Oct. 11-14, 1998 pp. 2664-2669 vol. 3 Digital Object Identifier 10.1109/ICSMC.1998.725062.*

Engineering design management: an information structure approach Yassine, A.; Innovation in Technology Management—The Key to Global Leadership. PICMET '97: Portland International Conference on Management and Technology Jul. 27-31, 1997 p. 483 Digital Object Identifier 10.1109/PICMET.1997.653479.*

An analytical method based on design structure matrix for modular identification Xiaogang, X.; Chao, L.; Jian, Y.; Yahua, C.; Computer-Aided Industrial Design and Conceptual Design, 2006. CAIDCD '06. 7th International Conference on Nov. 2006 pp. 1-4 Digital Object Identifier 10.1109/CAIDCD.2006.329358.*

A New Task Assignment Approach in Concurrent Engineering Bo Yang; Xiangbo Ze; Luning Liu; Computer Supported Cooperative Work in Design, 10th International Conference on May 2006 pp. 1-6 Digital Object Identifier 10.1109/CSCWD.2006.253010.*

An Study on Information Security Optimization Based on MFDSM Jun-Jie Lv; Wan-Hua Qiu; Yuan-Zhuo Wang; Na Zou; Machine Learning and Cybernetics, 2006 International Conference on Aug. 2006 pp. 2732-2736 Digital Object Identifier 10.1109/ICMLC.2006.258989.*

Goldberg, D. E., (1993a). "Making genetic algorithms fly: A lesson from the Wright brothers." *Advanced Technology for Developers*, 2, 1-8.

Ohsawa, Y., Benson, N. E., & Yachida, M., (1998) "KeyGraph: Automatic indexing by co-occurrence graph based on building construction metaphor." In *Proceedings of Advances in Digital Libraries*, pp. 12-18.

Takama, Y., & Hirota, K. (2000). "Discovery of topic distribution through WWW information retrieval process." *Proceedings of 2000 IEEE International Conference on Industrial Electronics, Control and Instrumentation*, 1644-1647.

Bingham, E., Kaban, A., & Girolami, M., (2003). "Topic identification in dynamical text by complexity pursuit." *Neural Processing Letters*, 17(1), 69-83.

Graetz, K., Barlow, C., Proulx, N., & Pape, L. (1997). "Facilitating idea generation in computer-based teleconferences," *Proceedings of the International ACM SIGGROUP Conference on Supporting Group Work (GROUP '97)*, 317-324.

Santanem, E., Briggs, R., & de Vreede, G. J., (2000). "The Cognitive Network Model of Creativity: a New Casual Model for Creativity and a New Brainstorming Technique," *Proceedings of the 33rd Annual Hawaii International Conference on System Sciences*, 2004.

Santanem, E., Briggs, R., & de Vreede, G.-J., (2002). "Toward an Understanding of Creative Solution Generation," *Proceedings of the 35th Annual Hawaii International Conference on System Sciences*, 2899-2908.

Goldberg, D.E., Sastry K., and Ohsawa Y., "Discovering Deep Building Blocks for Competent Genetic Algorithms Using Chance Discovery via KeyGraphs," (2003) pp. 1-23.

Goldberg, D. E., (1993b). "A Wright-brothers theory of genetic algorithms flight." *Systems, Control, and Information*, 37(8), 450-458.

Kosorukoff, A., & Goldberg, D. E. (2002). "Evolutionary computation as a form of organization." *Proceedings of the Genetic and Evolutionary Computation Conference (GECCO 2002)*, 965-972.

Takagi, H. (2001). "Interactive evolutionary computation: Fusion of the capabilities of EC optimization and human evaluation." *Proceedings of the IEEE*, 89(9), 1275-1296.

Welge, M. E., Auvil, L., Shirk, A., Bushell, C., Bajcsy, P., Cai, D., Redman, T., Clutter, D., Aydt, R., & Tcheng, D., (2003). *Data to Knowledge (D2K)* (Automated Learning Group Technical Report). Urbana, IL: National Center for Supercomputing Applications, University of Illinois at Urbana-Champaign.

Altus, S., Kroo, I., & Gage, P., A *Genetic Algorithm for Scheduling and Decomposition of Multidisciplinary Design Problems*, ASME Journal of Mechanical Design, vol. 118, Dec. 1996.

Harik, G., *Linkage learning via probabilistic modeling in the ECGA*. IlliGAL TR-99010, University of Illinois at Urbana-Champaign, Urbana, IL, 1999.

Lutz, R., *Recovering High-Level Structure of Software Systems Using a Minimum Description Length Principle*, R.F.E. Proceedings of the 13th Irish International Conference, Artificial Intelligence and Cognitive Science (AICS 2002), Sep. 2002.

Munemoto, M., & Goldberg, D.E., *Linkage Identification by Non-monotonocity Detection for Overlapping Functions*. IlliGAL Report No. 99005, Genetic and Evolutionary Computation Conference (GECCO-99), vol. 1, 1999.

Pelikan, M., Goldberg, D.E., & Cantú-Paz, E., *BOA: The Bayesian optimization algorithm*. Proceedings of the Genetic and Evolutionary Computation Conference (GECCO-99), vol. 1, pp. 525-532. Also IlliGAL TR-99003, University of Illinois at Urbana-Champaign, 1999.

Rogers, J. L., *DeMAID/GA User's Guide-Design Manager's Aid for Intelligent Decomposition With a Genetic Algorithm*, NASA TM-110241, Apr. 1996.

Salman, A., Mehrota, K., & Mohan, C., *Linkage Crossover for Genetic Algorithms*, Proceedings of the Genetic and Evolutionary Computation Conference (GECCO-99), vol. 1, pp. 564-571, 1999.

Smith, J. *On Appropriate Adaptation Levels for the Learning of Gene Linkage*. Journal of Genetic Programming and Evolvable Machines, vol. 3, No. 2, pp. 129-155, 2002.

Goldberg, D.E., Deb, K., Kargupta, H., Harik, G.: *Rapid, accurate optimization of difficult problems using fast messy genetic algorithms*. Proceedings of the Fifth International Conference on Genetic Algorithms pp. 56-64 (1993).

Ohsawa, Y. (2002). Chance discoveries for making decisions in complex real world. *New Generation Computing*, 20 (2), 143-163.

Ohsawa, Y., & Nara, Y. (2002). Understanding internet users on double helical model of chance-discovery process. In *Proceedings of the 2002 IEEE International Symposium on Intelligent Control*. pp. 844-849.

Goldberg, D. E., "The Design Of Innovation: Lessons from and for Competent Genetic Algorithms," Kluwer Academic Publishers, 2002.

Goldberg, D. E., "Genetic Algorithms in Search, Optimization & Machine Learning," Addison Wesley Longman, Inc., 1989.

* cited by examiner

| Node | A | B | C | D | E | F | G | H |
|---|---|---|---|---|---|---|---|---|
| Cluster 1 | 0 | 1 | 0 | 1 | 0 | 0 | 1 | 0 |
| Cluster 2 | 1 | 0 | 1 | 0 | 1 | 0 | 0 | 1 |
| Bus | 0 | 0 | 0 | 0 | 0 | 0 | 0 | 0 |

FIG. 7

| Length | $\log n_n$ | $3 \log n_n$ | $\log n_n$ | $4 \log n_n$ |
|---|---|---|---|---|
| Description | 3 | B,D,G | 4 | A,C,E,H |

| INPUT PROBLEM | OUTPUT RESULT |
|---|---|
|  |  |

(a) TWO NON-OVERLAPPING CLUSTERS.

|  |  |
|---|---|

(b) THREE OVERLAPPING CLUSTERS.

|  |  |
|---|---|

(c) THREE OVERLAPPING CLUSTERS WITH A BUS.

|  |  |
|---|---|

(d) 3-DIMENSIONAL OVERLAPPING CLUSTERS.
THE SHADOWED PART FORMS A CLUSTER.

METHODS AND PROGRAM PRODUCTS FOR OPTIMIZING PROBLEM CLUSTERING

STATEMENT OF GOVERNMENT INTEREST

This invention was made with Government assistance under United States Air Force Office of Scientific Research, Air Force Material Command, grant No. F49620-00-0163, AFOSR grant no. F49620-03-0129 and the National Science Foundation Grant No DMI-99-08252. The Government has certain rights in the invention.

FIELD OF THE INVENTION

The present invention is related to methods for optimizing clustering and modularity of problems, including within the framework of dependency structure matrices.

BACKGROUND OF THE INVENTION

Many real-world problems, systems, organizations and structures can be described in terms of interrelated modules. For example, a combustion engine could be described in very simple terms as elements of one or more combustion chambers, one or more pistons, a transmission, an ignition source, and a fuel supply. Some of these components are linked to others. The pistons, for instance, are linked to the combustion chambers and the drive train, and the fuel supply and ignition source are linked to the combustion chamber. Linked elements may be thought of as forming "modules." The pistons, combustion chamber, and ignition source, for example, may be described as a single module. In the analysis of many real-world problems, assembling elements into modules can be beneficial for purposes such as simplification of analysis.

Models are known that represent real-world systems and structures in terms of interrelated modules. A directed graph is one example of a model that does so. Another example is dependency structure matrix ("DSM") models. A DSM is a matrix representation of a directed graph that can be used to represent systems and structures, including a complex system.

Figure 1:
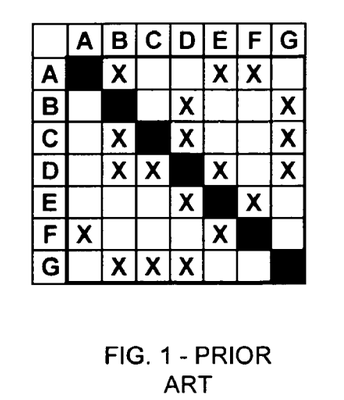
FIG. 1 is an exemplary DSM model of the prior art.

FIG. 1 illustrates a simple DSM. The column and row headings in the matrix (A-G) correspond to elements or nodes. "X" marks inside the matrix cells indicate whether corresponding nodes are related. For example, if there is an arrow from node C to node A in a directed graph indicating a relationship between nodes, then an 'X' mark is placed in row A and column C. As an alternative to symbols such "X" marks, numerical values may be used to indicate a degree of dependency. For example, a "9" might represent a strong dependency and a "2" a weak dependency. Diagonal elements have no significance and are normally blacked-out or used to store some element-specific attribute(s).

Figure 2A:
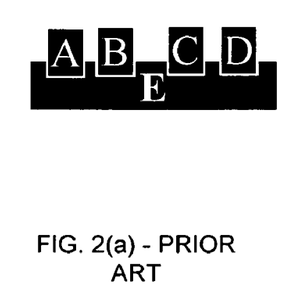
Figure 2B:
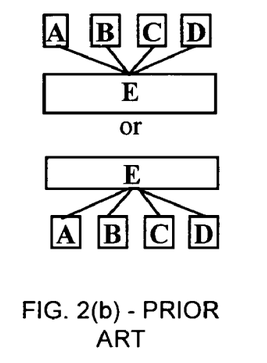
Figure 2C:
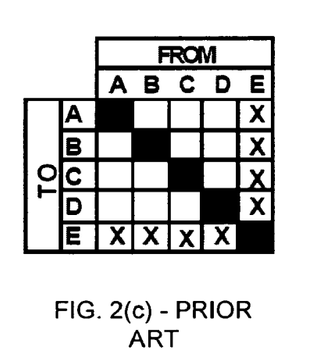
FIG. 2(c) is an exemplary DSM of the prior art representative of the schematics of FIGS. 2(a) and (b)

FIGS. 2(a), 2(b) and 2(c) are useful to further illustrate DSM's and their relations to other models, as well as their relation to real-world structures and organizations. FIG. 2(a) is a schematic of a structure where elements A, B, C and D all have a common interface with element E. In this configuration, element E may be referred to as a "bus." FIG. 2(b) includes two directed graphs that represent the structure of FIG. 2(a). FIG. 2(c) is a DSM that represents the structure and graphs of FIGS. 2(a) and (b).

Once a DSM has been constructed, it can be analyzed to identify modules, referred to within the DSM as clusters. This is a process referred to as "clustering." The goal of DSM clustering is to find subsets of DSM elements (i.e., the "clusters") that are mutually exclusive or minimally interacting. That is, clusters contain most, if not all, of the interactions (i.e., "X" marks) internally and the interactions or links between separate clusters are eliminated or minimized to transform the system into independent, loosely coupled, or nearly independent system modules. One of the significances of clusters can be that all or most of the elements within the cluster are largely limited to interact mainly with other elements in the cluster and likewise are not likely to interact with elements outside of the cluster. Clustering is therefore an important part of the usefulness of DSM's since it "transforms" the initial DSM element population into a simpler "modular" model.

Figure 3A:
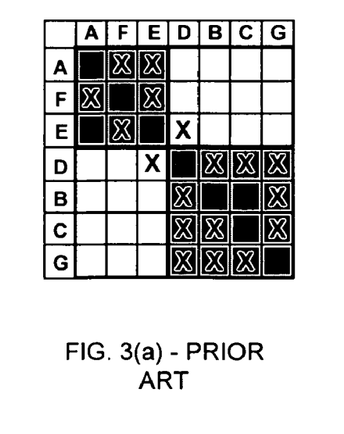
FIGS. 3(a) and 3(b) are exemplary DSM's of the prior art.
Figure 3B:
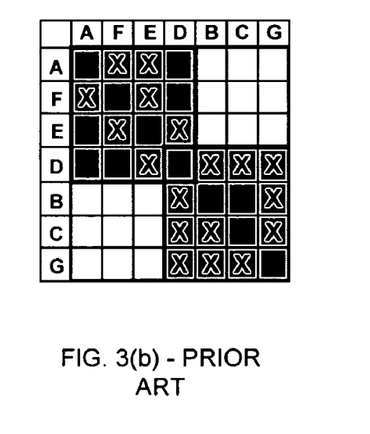

As a simple example of clustering, consider the identical DSM's of FIGS. 3(a) and 3(b). Column and row entries have been re-arranged from an initial alphabetic order to create the shaded clusters. As shown, different clustering metrics will result in different clusterings. FIG. 3(a) is the result of one potential clustering, with the cells representing interrelations between nodes D and E left out of clusters. The DSM of FIG. 3(b) shows a second potential clustering that includes the D-E cells, but that also has some overlap between the clusters. Which of these clustering arrangements is preferred over the other depends on a number of factors related to the particular system or model at hand, among other factors.

Figures 4, 4A, 4B, 4C:
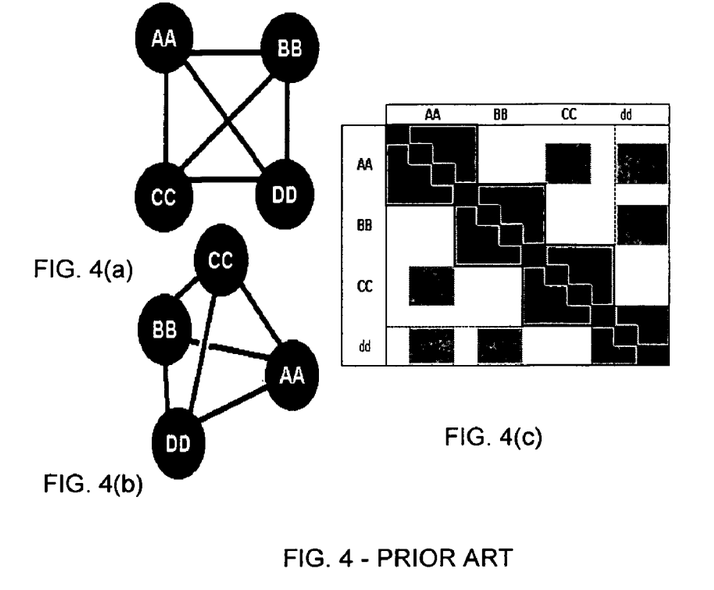

While the DSM's of FIGS. 1, 2 and 3 are relatively simple, it will be appreciated that many real-world DSM's can be extremely large and/or complex, and for these complex real-world cases clustering methods can be quite difficult. Consider, for instance, a simple three-dimensional structure such as a tetrahedron or three-dimensional pyramid. This is depicted in FIGS. 4(a) and 4(b) showing four equal clusters, each with dense internal relationships and weaker (or sparser) external relationships. If all the clusters are perfectly equal it is purely a matter of chance how any clustering method would present an answer, with one example illustrated in FIG. 4(c). In this example, cluster DD is the one that is visually disrupted most by being presented last in the sequence. This has the effect of spreading its inter-cluster relationships over a wider spatial area, which is depicted in the macro-scale DSM of FIG. (4c) as being lower density blocks of grey. To an untrained observer this might be thought to be a bus structure where cluster DD is the unique possessor of system wide integrating functions and some semi-random cross-linking occurs in the zone AA-CC.

Several methods are known for clustering real-world problems and structures. Several methods for creating modules of variables are discussed, for example, in "Notes on the Synthesis of Form," by Alexander, C., 1964, Harvard Press, Boston, Mass. Methods for partitioning DSM's are discussed in "The Design Structure System: A Method for Managing the Design of Complex Systems," by Steward, D. V., IEEE Transactions on Engineering Management 28 (1981) 77-74. Known methods for organizing modules and for clustering DSM's, however, leave many problems unresolved. Many fail to accurately predict the formation of "good" clustering arrangements for complex systems. Many known clustering methods when applied to complex DSM's have difficulty in extracting relevant information from the data, and then conveying the information to a user. Some methods suffer from an oversimplification of the objective function utilized. Others are susceptible to getting trapped in local optimal solutions. Many methods have difficulty in accurately representing busses and three-dimensional structures.

SUMMARY OF THE INVENTION

Exemplary embodiments of the present invention are directed to methods and program products for optimizing clustering of a design structure matrix. An embodiment of the present invention includes the steps of using a genetic operator to achieve an optimal clustering of a design structure matrix. Other exemplary embodiments of the invention leverage this optimal clustering by applying a genetic operator on a module-specific basis.

BRIEF DESCRIPTION OF THE DRAWINGS

FIGS. 2(a) and 2(b) are exemplary schematics of the prior art showing a bus relation, while

FIGS. 4(a) and 4(b) are exemplary schematics of the prior art showing a three dimensional tetrahedron relation, while FIG. 4(c) is an exemplary DSM of the prior art representative of the schematics of FIGS. 4(a) and (b);

DETAILED DESCRIPTION

Before discussing exemplary embodiments of the invention in detail, it will be appreciated that embodiments of the present invention lend themselves well to practice in the form of computer program products. Accordingly, it will appreciated that embodiments of the invention may comprise computer program products comprising computer executable instructions stored on a computer readable medium that when executed cause a computer to undertake certain steps. It will further be appreciated that the steps undertaken may comprise method embodiment steps, and in this sense that description made herein in regards to method embodiments likewise applies to steps undertaken by a computer as a result of execution of a computer program product embodiment of the invention.

Exemplary embodiments of the present invention are directed to methods and program products for optimizing clustering of a design structure matrix model. An embodiment of the present invention includes the sequential steps of applying at least one genetic operator to a parent population of design structure matrix clusterings to produce an offspring population of design structure matrix clusterings. In a next step, a scoring metric is used to score each of the offspring population of design structure matrix clusterings. The method is then terminated if a termination condition has been satisfied. If not, selection is performed to create a new parent population of clusterings. Selection may be performed in a probabilistic or deterministic manner, for example. After selection, the steps of generating offspring and scoring are repeated until the termination condition is satisfied. Other exemplary embodiments of the invention include additional steps of leveraging the optimal clustering that has been determined. Exemplary steps include using the optimized clusterings to create modules of variables from a parent population of variables.

It has been discovered that methods of applying a genetic operator to a parent DSM clustering population to generate an offspring clustering population will provide desirably optimized cluster structures for DSM's for many real-world problems. Through practice of the present invention, optimal clustering of DSM's can be efficiently achieved even when confronted with complex real-world problems that involve busses and/or three-dimensional structures.

Figure 5:
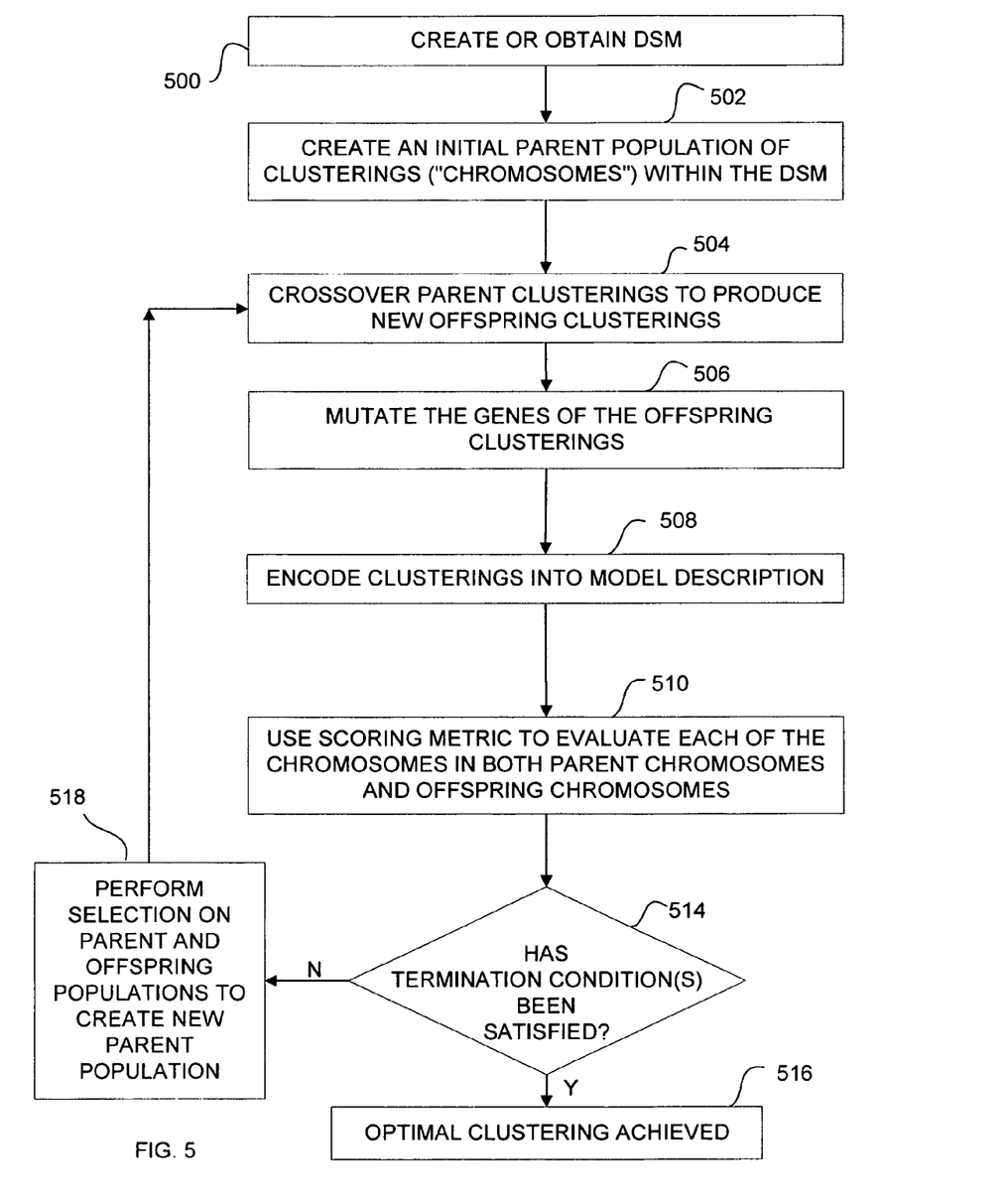
FIG. 5 is a flowchart illustrating the general steps of one exemplary embodiment of the invention.

FIG. 5 is a flowchart showing one exemplary embodiment of the invention. Initially, a DSM is created from a population of variables (step 500). This step of the invention embodiment may include studying a real-world system, structure, organization, or problem to identify variables that constitute the individual nodes identified along the axis of a DSM. The term "variables" as used herein is intended to be broadly interpreted as elements of a system, organization, or problem. For example, variables may be machine parts, system components, physical locations, people or organizational groups. In an additional step involved in creating a DSM, these components, people, or groups may be studied to identify which interact with others. For example, statistical analysis may be performed. With the information determined through these steps, an initial DSM may be generated. Alternatively, a DSM may be provided from an external source.

Figure 7:
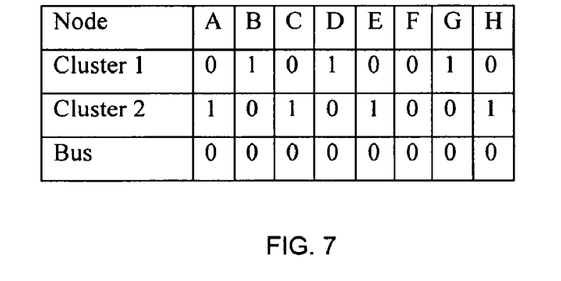
FIG. 7 is an exemplary binary encoding chromosome representative of the DSM of FIG. 6.

A parent population of clusterings or "chromosomes" for the DSM is then created ("chromosomes") (step 502). In the present invention embodiment, each chromosome may be thought of as one clustering. Each clustering or chromosome signifies the presence or absence of a variable in a particular cluster as shown generally in FIG. 7. The parent population consists of a plurality of different clusterings for the DSM. The individual clusterings may be developed through random generation, manual analysis, or any other suitable method. Each clustering, or chromosome, is made up of a collection of "genes," the parameters to be optimized, and represents a complete solution to the problem at hand. The gene values are usually initialized to random values within user-specified boundaries.

At least one genetic operator is then applied to the parent population of clusterings to create an offspring population of clusterings. In the exemplary method of FIG. 5, crossover is applied (step 504), followed by mutation (step 506). In the exemplary method, crossover is applied according to some defined probability $p_c$ (preferably high) and results in new offspring DSM clusterings that each have characteristics taken from both of its parent DSM clusterings. Exemplary methods of the invention include steps of using uniform crossover. A uniform crossover operator randomly switches each gene (e.g., clustering) of the two parent chromosomes (e.g., DSM clusterings) with a certain probability (for example, 0.5) to produce two new offspring. If an offspring takes the best parts from each of its parents, the result will likely be a better solution. In one exemplary method of the invention, $(\lambda+\mu)$ selection will be practiced, and the parent population includes $\lambda$ chromosomes. Two parents are randomly picked (without replacement) from the $\lambda$ chromosomes, and the reproduction is continued until μ offspring chromosomes have been produced.

Next, the genes of the offspring chromosomes are mutated (step 506). Mutation occurs according to some defined probability $p_m$ (typically low) and serves to introduce some variability into the gene pool. For a binary encoding chromosome, mutation inverts the value of genes (from 0 to 1, or from 1 to 0) with the mutation probability $p_m$. Without mutation, offspring chromosomes would be limited to only the genes available within the initial population. In addition to or as an alternative to crossover and mutation, other genetic operators may be applied in other invention embodiments. Other operators may be probabilistic, or may function through estimation of distribution, stochastic search, or the like.

In the exemplary method of the invention, the quality of the offspring population is evaluated. Specifically, each chromosome is evaluated using a scoring metric, sometimes also referred to as a fitness function, to determine the quality of the solution. In the exemplary embodiment of FIG. 5, this occurs through steps of encoding the clusterings into a model description (step 508), and then applying a scoring metric (step 510) to the encoded clusterings.

The encoding of step 508 is preferably capable of representing overlapping clusters and three-dimensional structures. In one exemplary step 508, the cluster encodings make up a binary string of $(c \cdot n_n)$ bits, where c is a predefined maximal number of clusters, and $n_n$ is the number of nodes. The $(x+n_n \cdot y)$-th bit represents that node (x+1) belongs to cluster (y+1). The last cluster is treated as a bus. For example, in the example DSM clustering of FIG. 6, $n_n$=8, and given that c is 3, then the model might be described by the chromosome shown in FIG. 7. Note that no nodes are present in the bus. When manipulated, the chromosome can be transformed into a binary string that is a concatenation of all rows: 010100101010100100000000.

Once encoded, the clusterings are evaluated through a scoring metric (step 510). Those knowledgeable in the art will appreciate that there are a number of scoring metrics suitable for practice with the invention. Preferably, the scoring metric conveys at least two general categories of information. The first category describes the complexity of clusters. For example, an exemplary first category describes the size of the data structure needed to represent the clustering. The second category describes the accuracy of the clusters. An exemplary second category describes the size of the data structure required to represent the inaccuracy of the clustering. The inaccuracy of the data may be represented by the mismatched data. As used herein, the term "mismatched data" is intended to broadly refer to the difference between the model clustering and the real-world DSM. For example, for a particular DSM, mis-matched data is signified by the unequal matrix entries between the real-world DSM and the DSM generated by a particular clustering model. Generally, low complexity and high accuracy clusterings are favored. In practice, these two desired qualities are often competing: very low complexity results tend to have relatively low accuracy while very high accuracy solutions tend to be relatively complex. An acceptable balance must be achieved between the two. In some exemplary methods of the invention, the two categories of information may be weighted as desired.

One preferred method of the invention includes steps of using the minimum description length ("MDL") scoring metric. The MDL can be interpreted as follows: among all possible models, choose the model that uses the minimal length for describing a given data set (that is, model description length plus mismatched data description length). For example, the encoding of a complicated DSM model should be longer than that of a simple model.

Figure 6:
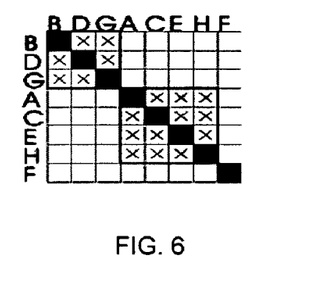
FIG. 6 is an exemplary DSM.
Figure 8:
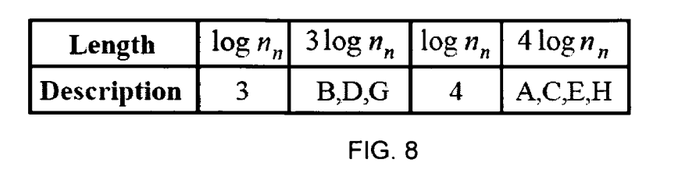
FIG. 8 shows an exemplary MDL model description for the DSM clustering arrangement of FIG. 6.

In the exemplary method embodiment, the MDL encoding of each cluster starts with a number that is sequentially assigned to each cluster, and then this is followed by a sequence of nodes in the cluster. By way of example, FIG. 8 shows the corresponding MDL model encoding for the simple DSM clustering arrangement of the DSM of FIG. 6. It is apparent that the length of this model description is as follows:

$$\sum_{i=1}^{n_c} (\log n_n + cl_i \cdot \log n_n) \qquad \text{EQTN. 1}$$

where $n_c$ is the number of clusters, $n_n$ is the number of nodes, $cl_i$ is the number of nodes in the $i^{th}$ cluster, and the logarithm base is 2. In the example of FIG. 6, $n_c$=2 clusters, $n_n$=8 nodes, $cl_1$=3, and $cl_2$=4. The MDL encoding of FIG. 8 can be interpreted as follows: "cluster 1 has 3 nodes: B, D, and G; cluster 2 has 4 nodes: A, C, E, and H". If $n_n$ and $n_c$ are known, then the resulting MDL encoding is uniquely decodable. $n_n$ is given, and by assuming $n_c \leq n_n$, $\log n_n$ bits are needed to describe $n_c$. The $\log n_n$ bits are fixed for all MDL encodings of a given DSM, and therefore they are omitted without loss of accuracy.

In order to achieve the second category of the MDL description that describes the mismatched data, an exemplary method step includes constructing a second DSM, referred to for convenience as DSM'. In the new second DSM', each entry $d'_{ij}$ is "1" if and only if:

1. some cluster contains both node i and node j simultaneously, or
2. the bus contains either node i or node j.

Next, $d'_{ij}$ is compared with the given $d_{ij}$. For every mismatched entry, where $d'_{ij} \neq d_{ij}$, a description should indicate where the mismatch occurred (i and j) and one additional bit to indicate whether the mismatch is zero-to-one or one-to-zero. Two mismatch sets can be defined: $S_1=\{(i,j) | d_{ij}=0, d_{ij}'=1\}$ and $S_2=\{(i, j) | d_{ij}=1, d_{ij}'=0\}$. The mismatch that contributes to $S_1$ may be referred to as the type 1 mismatch, and the mismatch that contributes to $s_2$ the type 2 mismatch. In the exemplary method of the invention, the mismatched data description length is given by:

$$\sum_{(i,j) \in S_1} (\log n_n + \log n_n + 1) + \sum_{(i,j) \in S_2} (\log n_n + \log n_n + 1) \qquad \text{EQTN. 2}$$

The first $\log n_n$ in the bracket indicates i, the second one indicates j, and the additional one bit indicates the type of mismatch.

The MDL clustering metric is given by the weighted summation of the MDL model description length according to EQTN. 1 (e.g., FIG. 8) and the mismatched data description given by EQTN. 2. With some arithmetic manipulations, the MDL metric of the exemplary method of the invention can be written as follows (EQTN. 3):

$$f_{DSM}(M) = (1 - \alpha - \beta) \cdot \left( n_c \log n_n + \log n_n \sum_{i=1}^{n_c} cl_i \right) +$$
$$\alpha \cdot [|S_1|(2\log n_n + 1)] + \beta \cdot [|S_2|(2\log n_n + 1)]$$

where α and β are weights between 0 and 1. In EQTN. 3, the first term represents complexity, and the second two terms taken together represent accuracy. The weights α and β may be used in some embodiments of the invention to adjust weighting of the two categories of information. For example, in some real-world problems the importance of achieving a model with minimal clusters may be far more important than minimizing mismatched data. In such a case, the category of cluster complexity could be applied a weighting of 0.9 and the category of cluster accuracy a weighting of 0.05. A naïve setting is α=β=⅓. Other settings are of course useful and may be selected as appropriate for reasons related to the particular real-world application at hand, or like reasons. For example, α and β may be set to mimic the behavior of a manual clustering arrangement.

Referring once again to the flowchart of FIG. 5, it is next determined whether a termination condition has been satisfied (step 514). The termination condition may include one or more criteria, with examples including the number of generations, and more complex criteria such as fitness convergence. In some invention embodiments, only a high scoring portion of the clusterings are examined to determine whether the termination condition has been met. If the termination condition has been satisfied, optimal clustering is defined (step 516).

It will be appreciated that as used herein, the term "optimal clustering" is intended to be broadly interpreted as meaning optimized to a desired degree. It will be understood that "optimal" clustering does not require the absolute best achievable clustering, but instead only a clustering that satisfies whatever termination condition was applied. For example, optimal clustering may be defined when the clustering meets some defined level of fitness. Optimal clustering may be defined, for example, when the offspring population converges sufficiently close to a single clustering. Or, optimal clustering may be defined by selecting the highest scoring offspring clustering after a desired number of generations have been created.

If the termination condition has not been met, another generation of clusterings will be created. Selection is first performed to select chromosomes that will have their information passed on to the next generation (step 518). Preferably, selection is performed on the combined parent and offspring population. Those skilled in the art will appreciate that many different forms of selection may be practiced. In an exemplary method embodiment, (λ+μ) selection is performed. Totally (λ+μ) chromosomes are evaluated. (λ+μ) selection chooses the Λ "best" chromosomes from the (λ+μ) chromosomes and passes them to the next generation. Elitism is embedded in (λ+μ) selection. In some circumstances, it may be useful to replace the entire parent population with that of the offspring. Each new iteration of steps 506-514 may be referred to as a generation. When the termination condition is satisfied, then optimal clustering has been achieved.

In order to further illustrate embodiments of the present invention and their benefits, a clustering was optimized on a number of input DSM's using a method of the invention consistent with that illustrated in FIG. 5. The input DSM and output optimized DSM clusterings are illustrated in FIGS. 9(a) -9(d). In each of the DSM's, the number of nodes is 9, the maximal number of clusters is set to 4, and hence the chromosome length is 4 ×9 =36. The crossover probability $p_c$ is 1, mutation probability $p_m$ is ¹⁄₃₆, and a (10+100) selection is adopted. Termination condition is set as detecting substantially no improvement for five generations. The weights in the MDL clustering metric for the two categories are set equally to ⅓.

Figure 9:
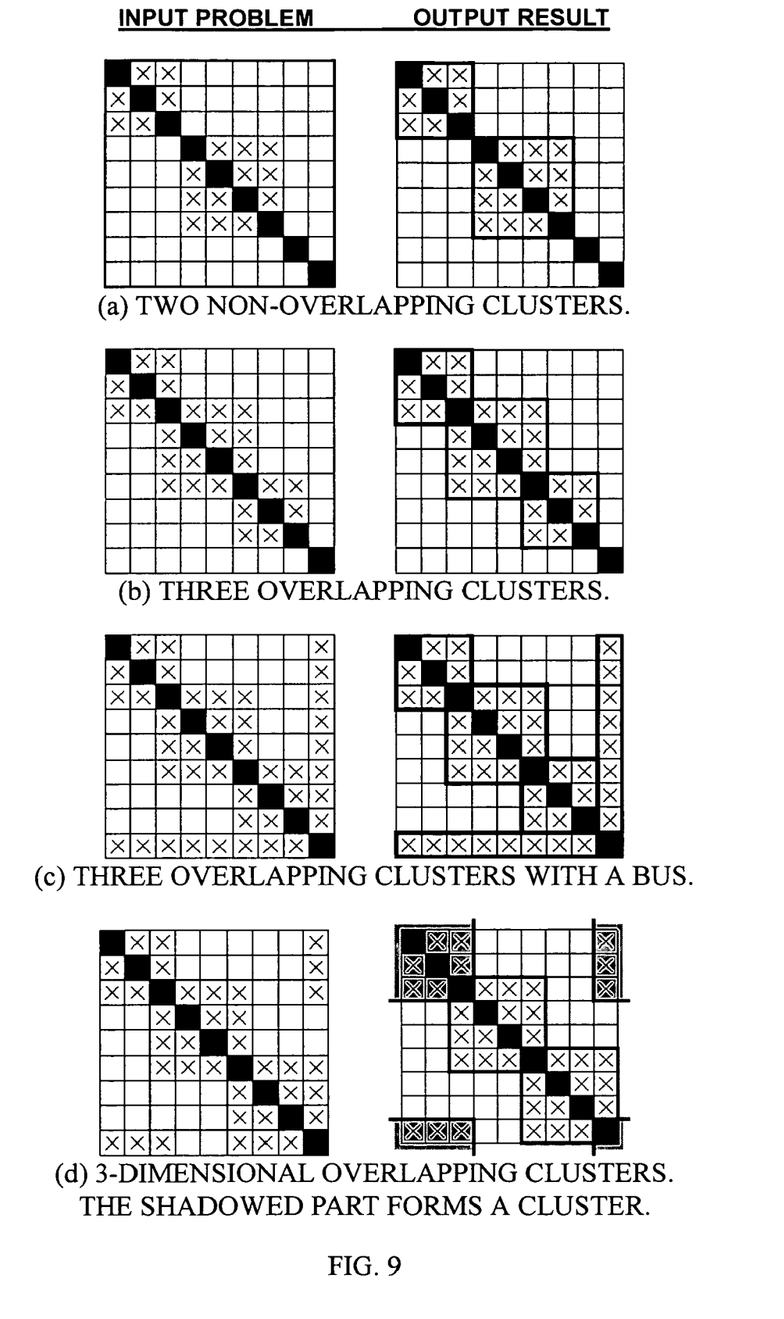
FIGS. 9(a)-9(d) illustrate DSM's before and after operation of a method of the invention.

The left column of FIG. 9 includes the given unclustered DSM, and the right column the optimized output after operation of a method of the invention. FIG. 9(a) represents a simple case with two non-overlapping clusters. FIG. 9(b) illustrates the ability of the present invention to identify overlapping clusters. In FIG. 9(c), a bus has been is introduced, and the method of the invention is able to identify it. Finally, the DSM in FIG. 9(d) resembles the DSM of FIG. 9(c). The resulting clustered DSM after operation of a method of the invention, however, is totally different. Through the method of the invention, three overlapping clusters were recognized instead of a bus. FIG. 9(d) also demonstrates the ability of methods of the invention to identify three-dimensional structures. It is interesting to note that the DSM's given in FIGS. 9(c) and 9(d) are similar but that the clustering results are quite different. These results show that the present invention is able to solve complex problems with overlapping clusters, a bus, or three-dimensional structures.

In order to further illustrate a method of the invention, it was applied to a real-world DSM problem. A DSM for a generic 10 MWe gas turbine driven electrical generator set was constructed by decomposing it into 31 sub-systems. The sub-systems initially were listed randomly in the DSM and then tick marks denoting material relationship from one sub-system to another were inserted. Intuitive manual clustering of such a DSM can yield different results depending on the extent to which a single group of system-wide relationships is emphasized over "good" clusters. One alternative arrangement is shown in the manually clustered DSM of the prior art shown in FIG. 10.

Figure 10:
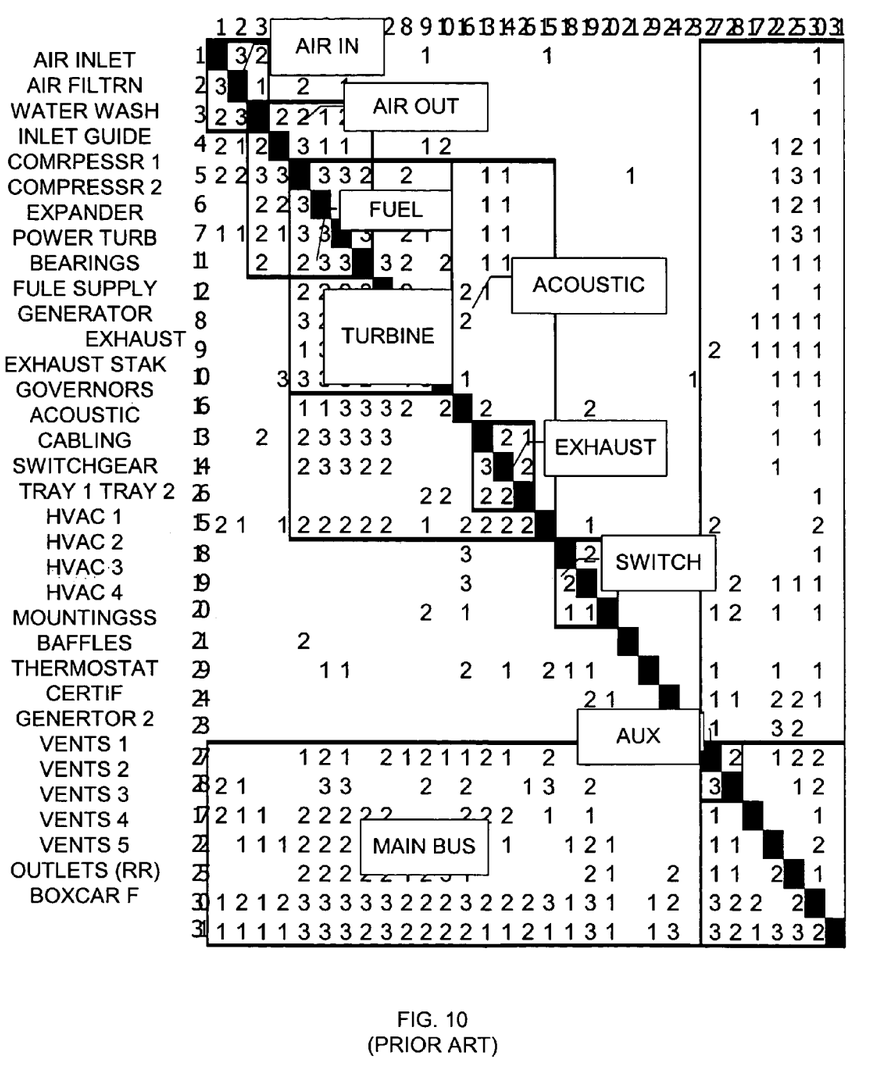
FIG. 10 is a manually clustered DSM of the prior art.

The prior art manually clustered DSM of FIG. 10 took few manual changes to the order of elements in the initial DSM, which revealed the clusters marked. After inspection of the clusters, they were given names to identify them. Some clusters are isolated (e.g. the switchgear) while others overlap (e.g. air clean-up with the gas generator) or are completely embedded in a larger cluster (e.g. turbine island within the acoustic sources).

To illustrate the method of the invention, it will be applied to the DSM of FIG. 10. All entries in clusters and the bus will be assigned a value of 1, and all entries outside will be assigned a value of 0. Then the preference of human clustering is: $|S_1|$=190 and $|S_2|$=35, where $S_1$ and $S_2$ are the two mismatch data sets defined herein above. Expressed another way, the two mismatch data sets for this real-world example have been set to reflect that humans tend to endure the type 1 mismatch more than the type 2 mismatch. According to the observation, a value of α:β=35:190 is set in the MDL clustering metric. By keeping (1−α−β)=⅓ (the weight of the model description length remains the same), α≅0.1037 and β≅0.5630 are obtained. The maximal number of clusters is set to 6, and the number of nodes is 31. This yields a 186-bit chromosome. Crossover probability is 1 and mutation probability is set to ¹⁄₁₈₆. Termination condition is defined as substantially no improvement in ten generations.

It was found that (100+10000) selection produces satisfactory results. The method of the invention was carried out in the form of a computer program product running on a computer equipped with an AMD Athlon™ processor and Windows XP 2000 operating system. In this operating environment the method of the invention converged within five minutes and 40 generations.

Figure 11:
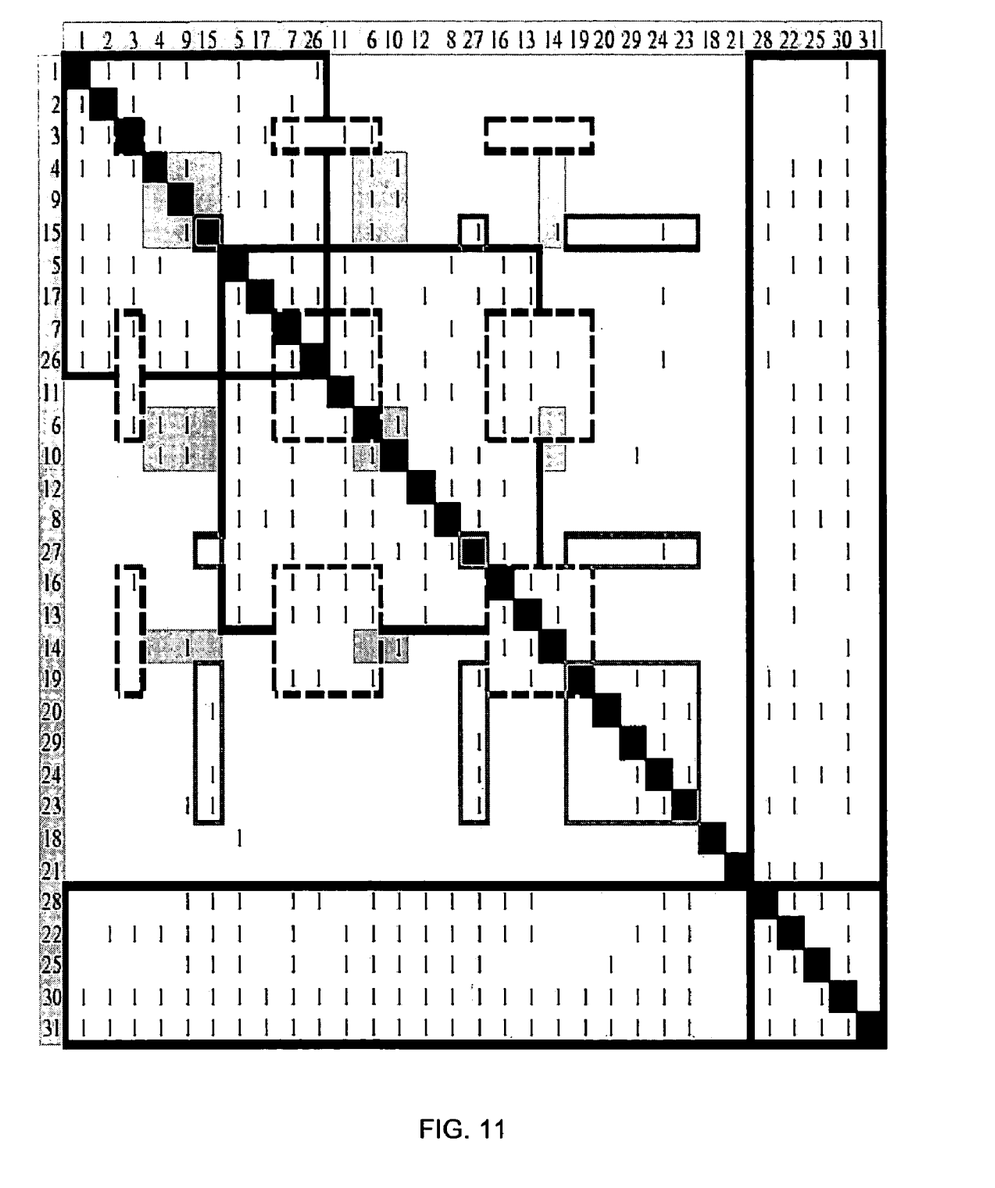
FIG. 11 illustrates the result of clustering by the method of the invention.

FIG. 11 illustrates the result of the automated clustering by the method of the invention. Practice of the invention resulted in five clusters (two in dark border, one in light border, one in dashed border, and one in shadows) and a bus. Comparing this to the manually generated DSM of the prior art shown in FIG. 10 is useful to highlight some of the advantages and benefits of the present invention. First, manual clustering has a tendency to ignore three-dimensional structures because DSM's are two-dimensional representations. That is, when humans are inspecting a DSM, they are really looking at a 2-dimensional projection of the real object (which may be 3-dimensional for complex products). The method of the present invention, on the other hand, does not suffer this tendency, and is capable of finding three-dimensional structures.

Also, the novel mismatch data set weighting used in the scoring metric of the present invention provides a more beneficial balance in the two types of mismatches than does manual DSM clustering of the prior art. In the manual version of the DSM of FIG. 10, some clusters are denser (e.g. Exhausts) while others are sparser (e.g. Acoustic). In the DSM of FIG. 11, on the other hand, clusters and the bus have roughly the same density.

The mismatch data sets and their weighting therefore provide the present invention with valuable flexibility. These elements of the invention allow the scoring metric practiced to be "tuned" to mimic a desired priority of selection, such as a human experts' preference. One step for tuning the scoring metric is to tune the weightings α and β. Other steps are also contemplated, such as tuning the weight of the model description.

Figure 12:
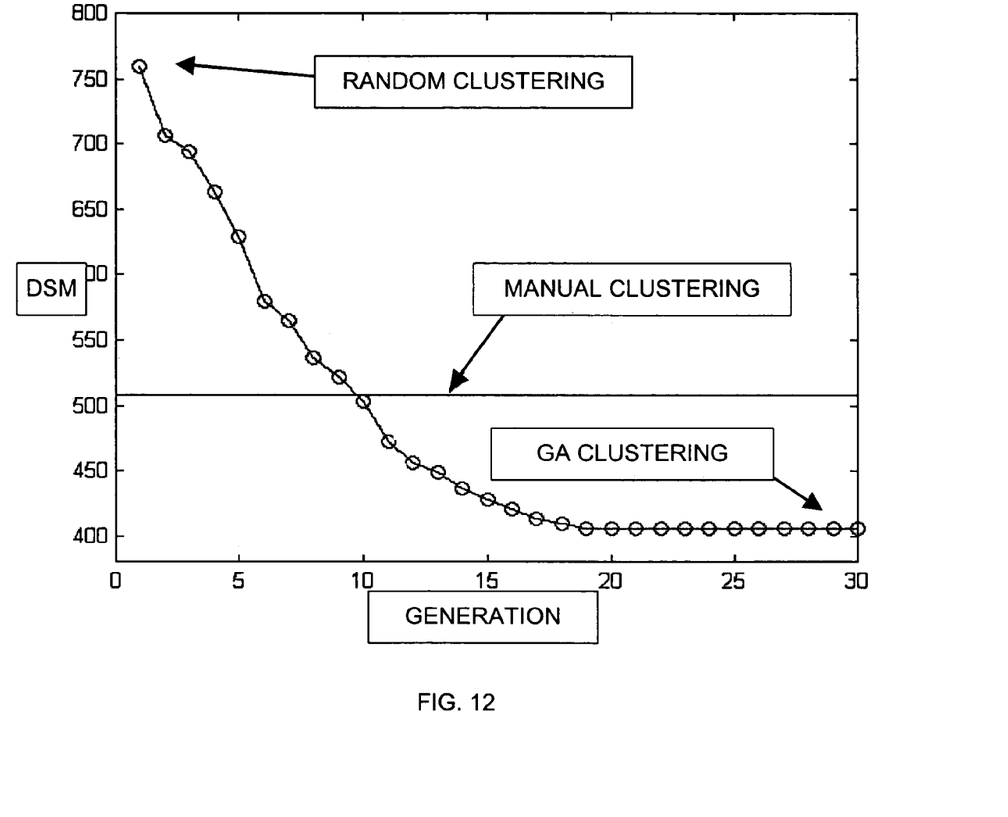
FIG. 12 is a chart illustrating performance of an exemplary method of the invention; and, FIG. 13 is a flowchart of an additional exemplary method of the invention.

The results of FIG. 11 also illustrate that under some circumstances the method of the invention provides a much more rigorous solution than prior art manual DSM clustering. Using the MDL scoring metric, the description length of manual clustering in FIG. 10 is 507.43 bits, which is superior compared to a random clustering which on average needs roughly 758 bits. The graph of FIG. 12 further illustrates some of the benefits of the method of the invention as compared to manual clustering. FIG. 12 shows that the average solution quality given by the method of the invention outperformed manual clustering after the 10th generations.

Figure 13:
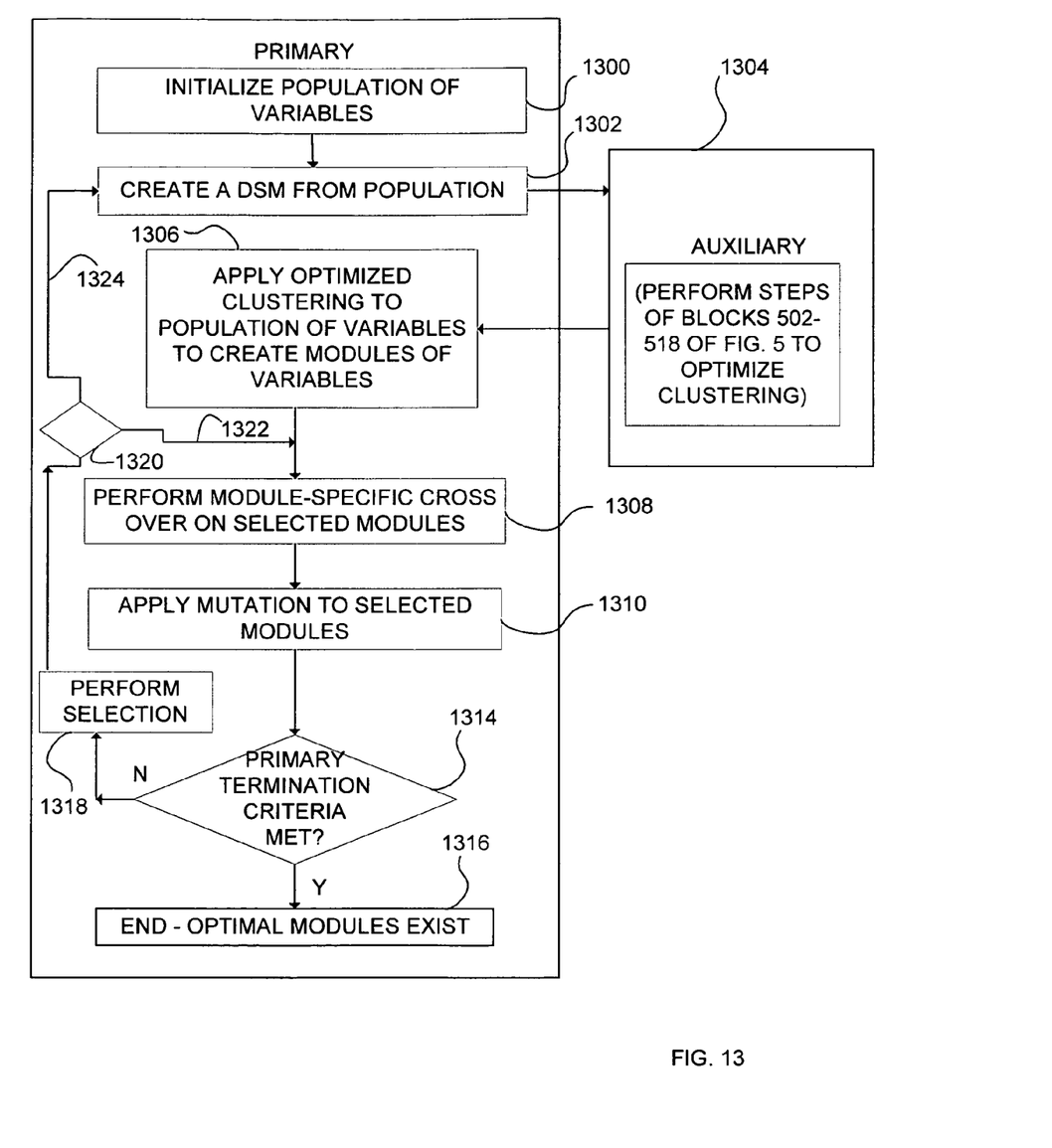

FIG. 13 is a flowchart illustrating still an additional method embodiment of the invention that extends the benefits and advantages achieved through the invention embodiment of FIG. 5. Generally, the invention embodiment of FIG. 13 applies the optimal clustering achieved through practice of the method of FIG. 5 to optimize a population of variables. Optimal clustering achieved through the steps of FIG. 5 will be used to create modules of the variables, which are then operated on by a genetic operator on a modular specific basis.

With reference now drawn to FIG. 13, it shows two general sets of steps: one is to solve a given problem, referred to as the Primary set, and the other is to achieve optimal clustering, referred to as the Auxiliary set. An exemplary auxiliary set is the method embodiment of FIG. 5. Broadly speaking, the strategy of the method embodiment of FIG. 13 is to use the auxiliary set to identify an optimal clustering, and then to use this optimal clustering to determine modules of variables within the primary set of variables. The optimal clustering achieved may be thought of as conveying modularity or "building block" information about the problem at hand. The clusters at a fundamental level describe problem variables that have a high level of interaction within clusters and a low level of interaction between clusters. Thus using these clusters to organize variables into modules allows the problem to be addressed within an accurate modular framework. It has been discovered that doing so offers substantial benefits and advantages.

Referring now to the flowchart of FIG. 13, a primary population of variables is first initialized (step 1300). This may comprise collecting variables that define a problem. For example, the components of an engine might be listed. A DSM is then constructed (step 1302). This may entail statistical or other analysis, or any number of suitable processes for developing a DSM.

In one exemplary step 1302, the dependency of gene i and gene j can be detected in a manner similar to Linkage Identification by Non-linearity Checking, or "LINC," where a "gene" can be a variable, a collection of variables, or a sub-component of a variable. $\theta_{a_i=x,a_j=y}$ is defined as the fitness value of the schema where the i-th gene is x, the j-th gene is y, and the rest are * (wild card). For example, for i=2 and j=5 in a 5-bit problem, $\theta_{a_i=0,a_j=1}=\theta(* 0 * * 1)$. If the i-th gene and the j-th gene are independent (linear), $\theta_{a_i=0,a_j=1}-\theta_{a_i=0,a_j=0}$ and $\theta_{a_i=1,a_j=1}-\theta_{a_i=1,a_j=0}$ interaction (non-linearity) between the i-th gene and the j-th gene is defined as:

$$\Delta_{ij} = |f_{a_i=0,a_j=1} - f_{a_i=0,a_j=0} - f_{a_i=1,a_j=1} = 0|$$

However, the fitness value of schemata cannot be computed unless every possible combination is visited. Now the task is to approximate $\Delta_{ij}$ with $s_{ij}$ that is computed based on the individuals seen so far. First, define the sampled fitness of a schema in the population of the t-th generation as:

$$f^t_{a_i=x,a_j=y} = \frac{1}{n_a} \sum_{a \in P^t, a_i=y} f(a)$$

where t is the generation, $P_t$ is the population of the t-th generation, f is the fitness function, a is an individual where its i-th gene is x and j-th gene is y, and $n_a$ is the number of such a in the population.

$$f^t_{ai=x,aj=y}$$

is undefined if $n_a$ is zero. The information of interactions gathered from the population is:

$$s^t_{ij} = |f^t_{ai=o,aj=1} - f^t_{ai=0,aj=0} - f^t_{ai=1,aj=1} + f^t_{ai=1,aj=0}|$$

is undefined if any of the $$f^t_{ai,aj}$$

is undefined. To utilize all individuals of all populations seen so far, $s_{ij}^t$ is then averaged over generations. Define a set $D=\{s^{i \neq t}|s_{ij}^t \text{ is defined}\}$, then $$s_{ij} = \frac{1}{|D|} \sum_{t=1, s_{ij}^t \in D}^{T} s_{ij}^t$$

where T is the current generation. |D| equals to T if every $s_{ij}^t$ is defined.

With a threshold θ, $s_{ij}$ is then transferred into 0-1 domain, and a DSM is constructed:

$d_{ij}=0$ if $s_{ij} \leq \theta$, and $d_{ij}=1$ if $s_{ij} \geq \theta$

In this exemplary step 1302, the threshold θ is calculated by a two-mean algorithm (a special case of the k-mean algorithm, where k=2). The threshold can also be set according to some prior knowledge such as non-linearity, or to another value as may be desirable. The two-mean algorithm can be briefly described as follows. With an initial guessed threshold (e.g., the mean of the given data), separate the given data into two clusters. Next, the threshold is updated by the average of the two means of the two clusters. Then separate the given data once again into two clusters by the updated threshold. This process is repeated until the clustering does not change anymore, and the desired threshold is finally obtained.

Note that instead of computing the fitness values of schemata directly form all individuals seen in all previous generations, the method of the present invention is two-fold averaging. First, fitness values of schemata are computed via averaging for each generation. Second, the interaction information ($s_{ij}$) is computed via averaging from $s_{ij}^t$ for each generation. There are several advantages for doing so. For example, $s_{ij}$ is less biased, and $s_{ij}$ is becoming stable as the method moves towards convergence. Also, as the solutions converge, the fitness values get higher and populations lose diversity. Accordingly, a bias may occur if the two-fold averaging scheme is not used. Also, two-fold averaging adds to stability.

The DSM is then passed to the auxiliary method, for performance of the steps 502-518 of FIG. 5. Through these steps that have been discussed in detail above, optimal clustering will be developed. Once developed, this optimal clustering is communicated back to the Primary set of steps and is used to organize the population of variables into modules (step 1306). The modules correspond to the optimal clusters, and represent groups of variables that have a relatively high rate of interaction with one another and relatively low rate of interaction with variables from other modules. At least one genetic operator is then applied to the variables on a module-specific basis. In the exemplary method of FIG. 13, crossover is applied (step 1308). All or only a portion of the modules may be selected for application of the genetic operator. For example, a probability may be applied to select modules for crossover.

As used herein, the term "module-specific" is intended to be broadly interpreted as applying to the modules. Module-specific crossover is like traditional crossover except that entire modules are crossed-over instead of individual genes. For example, if a cluster and its corresponding module includes genes 1, 3 and 5, then module-specific crossover would entail collectively crossing over all of genes 1, 3 and 5 as opposed to considering the genes individually. Further, it will be appreciated that since the modules may correspond to the clusters, the term "cluster-specific" is intended to be broadly interpreted in a like manner as "module-specific." Cluster specific cross over, for example, is intended to broadly refer to crossing over of all of the variables within a crossed over cluster.

The module-specific crossover of step 1308 may be further illustrated by another example. Assume a DSM includes variables 1-10. Assume at the conclusion of the method of FIG. 5 (e.g., at step 1306 of FIG. 13), optimal clustering included 5 clusters as follows:

cluster 1: (1, 6, 8)
cluster 2: (2, 3, 4)
cluster 3: (5)
cluster 4: (7)
cluster 5: (9, 10, 6)

Note that variable 6 is contained in two overlapping clusters: 1 and 5. Corresponding modules of variables will be constructed, and may be considered to include the identical genes. Through the step of step 1308, module-specific crossover would be performed on genes within the framework of this clustering/modularity. For ease of illustration, assume that two parent genes are 1111111111 and 0000000000. Further assume that a probability of module exchange is set at 50%, and that as a result of applying this probability modules 1 and 4 are to be crossed over. The module-specific crossover operation can then be illustrated as:

Before module-specific Crossover:

|  | Gene: | | | | | | | | | |
| --- | --- | --- | --- | --- | --- | --- | --- | --- | --- | --- |
|  | 1 | 2 | 3 | 4 | 5 | 6 | 7 | 8 | 9 | 10 |
| Parent 1 | 1 | 1 | 1 | 1 | 1 | 1 | 1 | 1 | 1 | 1 |
| Parent 2 | 0 | 0 | 0 | 0 | 0 | 0 | 0 | 0 | 0 | 0 |

After module-specific Crossover:

|  | Gene: | | | | | | | | | |
| --- | --- | --- | --- | --- | --- | --- | --- | --- | --- | --- |
|  | 1 | 2 | 3 | 4 | 5 | 6 | 7 | 8 | 9 | 10 |
| Offspring 1 | 0 | 1 | 1 | 1 | 1 | 0 | 0 | 0 | 1 | 1 |
| Offspring 2 | 1 | 0 | 0 | 0 | 0 | 1 | 1 | 1 | 0 | 0 |

Accordingly, module-specific crossover has resulted in the genes in only the 1st and 4th clusters being crossed over.

Mutation is next performed (step 1310) to introduce some variability into the gene pool. It may be introduced at some probability and desired level—for example 50% of the population may be mutated by altering of one gene. The method of FIG. 13 next includes a step of determining whether a primary termination condition has been satisfied (step 1314). This condition may include one or more criteria, with examples including a number of iterations, fitness convergence, or the like. If the condition has been met, the method is ended with an optimum solution set achieved (step 1316).

If the termination condition has not been met, the method of FIG. 13 generates another generation of modules. Selection is performed on the set of variable modules (step 1318). Following selection, two options exist for the particular steps to accomplish this. Decision box 1320 represents the path selection decision. Under a first option, the path of line 1322 is followed, and crossover and mutation are applied once again to selected of the variable modules. Under a second option that follows path 1324, the modules are passed back to the Auxiliary steps for determining a new optimal clustering. Thus another iteration of the steps, including the Auxiliary steps 502-518 of FIG. 5 is performed. The modules of variables are converted back into a DSM (at step 1302) for clustering in the Auxiliary steps 1304. Optionally, the step 1302 performed through the path of 1324 includes taking advantage of the previous clustering. That is, instead of simply starting from scratch and creating a new DSM from the current population of variables and modules, knowledge from the previous DSM is also used. Using the previous DSM may permit a faster and less-costly computation of an updated DSM when compared to starting from scratch.

The two paths represented by 1322 and 1324 can generally be described as a more exacting and computationally expensive solution (path 1324), and a less exacting but computationally less expensive option (path 1322). The decision at step 1320 that determines which path to follow can therefore be made on the basis of balancing computational expense verses accuracy of solution. In many cases, the computational expense advantages to be gained through the path 1322 are believed to outweigh its accuracy of solution disadvantages. Other decision criteria at step 1320 can also be used.

In order to further illustrate the embodiment of FIG. 13, several experiments were performed. For comparison purposes, a genetic algorithm ("GA") using 2-point crossover of the prior art was used to solve a test function, which was also solved using the method of FIG. 13. 2-point crossover was used, as well as the MDL scoring metric within the auxiliary method of FIG. 5. The test function is a 30-bit MaxTrap problem composed of 10, 3-bit trap functions. The 3-bit trap is given by $$f_{trap}^3(u) = \{0.9 \text{ if } u = 0; 0.45 \text{ if } u = 1; 0.0 \text{ if } u = 2; \text{ and } 1.0 \text{ if } u = 3\}$$

where u is the number of 1's. Three linkage cases were tested: tight linkage, loose linkage, and random linkage. Define U(x) as a counting function that counts the number of 1's in x. In the tight linkage test, genes are arranged as:

$$\text{fitness} = f_{trap}^3(U(x_1 + x_2 + x_3)) + f_{trap}^3(U(x_4 + x_5 + x_6)) + \ldots$$

In the loose linkage test case, alleles are arranged as $$\text{fitness} = f_{trap}^3(U(x_1 + x_{11} + x_{21})) + f_{trap}^3(U(x_2 + x_{12} + x_{22})) + \ldots$$

Given the failure rate to be 1/10, the population size is set as 182 by the gambler's ruin model. In the primary set of steps of FIG. 13, binary tournament selection was adopted, and no mutation was used. In the auxiliary set of steps the maximal number of cluster $n_{cmax}$ is 10 (equal to m), and the mutation probability $p_m$ was set to be 1/30. A ($\lambda+\mu$) selection was adopted, where $\lambda=5$ and $\mu=500$.

The simple GA converged only for the tight linkage case, and took 40 generations to do so. For loose and random linkage cases, the SGA did not achieve useful results because of modular building block disruption. The method of FIG. 13 using module-specific crossover, on the other hand, converged for all three linkages. Further, in the tight linkage test, the method of FIG. 13 converged at the 22nd generation thereby significantly outperforming the SGA (converged at the 40th generation). The superior performance is believed to result from the lesser disruption of modular building blocks. This conclusion is supported by the DSM created by the method of FIG. 13 for the tight linkage case, which included 10, 3-bit clusters located on the diagonal. By the 5th generation, the method was able to identify eight clusters. All of the clusters were identified by the 10th generation.

Accordingly, methods of the invention including the exemplary method illustrated in FIG. 13 offer valuable advantages and benefits. They leverage the ability of the method of FIG. 5 to identify optimal clustering, and utilize this optimal clustering to more effectively evolve solutions from populations of variables. Solutions are achieved in a faster and more accurate manner than was possible using many methods of the prior art. Through recognition of modular building blocks or clusters, solutions can be achieved even when variables display only loose or random linkages. Further, the methods of the invention are believed to scale very well to solve a wide variety of problems that may have been impractical or impossible to address using methods of the prior art due to their size.

Those knowledgeable in the art will also appreciate that the present invention is well suited for practice in the form of a computer program product, and accordingly that the present invention may comprise computer program product embodiments. Indeed, it will be appreciated that the relatively intense calculational nature and manipulation of data that steps of invention embodiments comprise suggest that practice in the form of a computer program product will be advantageous. These program product embodiments may comprise computer executable instructions embedded in a computer readable medium that when executed by a computer cause the computer to carry out various steps. The executable instructions may comprise computer program language instructions that have been compiled into a machine-readable format. The computer readable medium may comprise, by way of example, a magnetic, optical, or circuitry medium useful for storing data. Also, it will be appreciated that the term "computer" as used herein is intended to broadly refer to any machine capable of reading and executing recorded instructions.

The steps performed by the computer upon execution of the instructions may generally be considered to be steps of method embodiments of the invention. That is, as discussed herein it will be understood that method embodiment steps may likewise comprise program product steps. With reference to the flowcharts of FIGS. 5 and 13 by way of example, it will be appreciated that the invention embodiments illustrated may comprise a method embodiment or a computer program embodiment. It will also be appreciated that the steps of these embodiments may be changed or eliminated as may be appropriate for practice with a computer. For example, a computer program product invention embodiment may not comprise a step of generating a first solution set, but may instead receive a first solution set as user provided input or otherwise query a source for the first solution set.

It is intended that the specific embodiments and configurations herein disclosed are illustrative of the preferred and best modes for practicing the invention, and should not be interpreted as limitations on the scope of the invention as defined by the appended claims.

What is claimed is:

1. A method for optimizing clustering in a design structure matrix comprising the steps of:
    applying at least one genetic operator to a parent population of design structure matrix clusterings to produce an offspring population of design structure matrix clusterings;
    using a scoring metric to score each of said offspring population of design structure matrix clusterings;
    terminating the method if a termination condition has been satisfied and defining an optimal design structure matrix clustering; and,
    performing a selection operation to generate a new parent population of design structure matrix clusterings if said termination condition has not been satisfied and repeating said steps of applying at least one genetic operator to said new parent population to generate a new offspring population, using a scoring metric to score said new offspring population, and terminating the method if a termination condition has been satisfied, until said termination condition is satisfied.

2. A method as defined by claim 1 wherein the step of performing a selection operation includes replacing at least a portion of said parent population of design structure matrix clusterings with a high scoring portion of said offspring population of design structure matrix clusterings.

3. A method as defined by claim 1 wherein said at least one genetic operator is one or more of a crossover operator and a mutation operator.

4. A method as defined by claim 1 wherein said at least one genetic operator is one or more of a probabilistic operator, a distribution estimation operator, and a stochastic search operator.

5. A method as defined by claim 1 wherein the step of applying at least one genetic operator comprises applying said at least one genetic operator according to a probability.

6. A method as defined by claim 1 wherein the step of determining if a termination condition has been satisfied comprises determining if a particular number of iterations of said steps of applying a genetic operator to said parent population of design structure matrix clusterings and of scoring said offspring population of design structure matrix clusterings have been performed.

7. A method as defined by claim 1 wherein said scoring metric conveys at least two categories of information including cluster complexity and cluster accuracy.

8. A method as defined by claim 1 wherein said scoring metric comprises a minimum description length scoring metric.

9. A method as defined by claim 8 wherein the step of using said minimum description length scoring metric comprises:
    using said minimum description length scoring metric to describe each of said plurality of design structure matrix clusterings in said offspring population of design structure matrix clusterings as a sum of a first component that describes the size of a data structure required to represent said design structure matrix clustering and a second component that describes the size of a data structure required to describe mismatched nodes from said design structure matrix clustering.

10. A method as defined by claim 9 and further including the step of weighting said first and second components.

11. A method as defined by claim 8 wherein each of said offspring population of design structure matrix clusterings is represented as:

$$\sum_{i=1}^{n_c} \log n_c + (\log n_c) \times cl_i$$

where $n_c$ is the number of clusters in said each of said offspring population of design structure matrix clusterings, $n_n$ is the number of nodes, and $cl_i$ is the number of nodes in the $i^{th}$ cluster, and log is based on 2.

12. A method as defined by claim 1 wherein at least one of said offspring population of design structure matrix clusterings has at least two clusters that overlap with one another.

13. A method as defined by claim 1 wherein at least one of said offspring population of design structure matrix clusterings has a bus.

14. A method as defined by claim 1 and further including an initial step of developing the design structure matrix.

15. A method as defined by claim 1 and further including an initial step of generating said parent population of design structure matrix clusterings through random clustering.

16. A method as defined by claim 1 and further including the step of developing said parent population of design structure matrix clusterings by representing interactions between the i-th and j-th gene in a population using the relationship:

$$s_{ij}^t = |f_{ai=0,aj=1}^t - f_{ai=0,aj=0}^t - f_{ai=1,aj=1}^t + f_{ai=1,aj=0}^t|$$

where $$f_{ai=x,aj=y}^t$$

is the fitness value where the i=th gene is x and the j-th gene is y, and t is the generation;
    defining a set $D=\{s_{ij}^t | s_{ij}^t \text{ is defined}\}$ where $$s_{ij} = \frac{1}{|D|} \sum_{t=1, s_{ij}^t \in D}^{T} s_{ij}^t$$

where T is the current generation; and
    wherein said parent population of clustered design structure matrix models are binary and have a plurality of cell $d_{i,j}$ that are assigned binary values according to a threshold $\theta$:
    $d_{i,j} = \{0 \text{ if } s_{ij} \leq \theta; \text{ and } 1 \text{ if } s_{ij} \geq \theta\}$.

17. A method as defined by claim 16 and further including the step of assigning said threshold $\theta$ according to a two-mean algorithm.

18. A method as defined by claim 1 wherein said termination condition occurs when said offspring population of design structure matrix clusterings converges, and wherein the converged offspring population of design structure matrix clusterings is defined as said optimal design structure matrix clustering.

19. A method as defined by claim 1 wherein the step of defining said optimal design structure matrix clustering includes selecting the highest scoring of said offspring population of design structure matrix clusterings.

20. A method as defined by claim 1 and further including the step of using said optimal design structure matrix clustering to organize a population of variables into modules.

21. A method as defined by claim 20 wherein said at least one genetic operator is at least one first genetic operator, and wherein the method further includes the step of applying at least one second genetic operator to said population of variables on a module-specific basis.

22. A method as defined by claim 21 wherein the step of applying said at least one second genetic operator and the steps of claim 1 are performed iteratively until a second termination condition is satisfied.

23. A method as defined by claim 21 and further comprising a step of using a selection criteria to select a portion of said modules to apply said at least one second genetic operator to, and wherein said at least one second genetic operator includes one or more of crossover and mutation.

24. A method as defined by claim 21 wherein said termination condition is a first termination condition, and wherein the step of applying at least one second genetic operator to said population of variables on a module-specific basis is followed by a step of determining whether a second termination condition has been met, and of repeating said step of applying at least one second genetic operator to said population of variables on a module-specific basis until said second termination condition is met.

25. A method as defined by claim 1 and further including a step of using said optimal design structure matrix clustering to organize a population of variables into modules, and of applying crossover to either all or none of said variables within each of said modules.

26. A method for organizing variables into modules, comprising the steps of:
    developing a design structure matrix from the population of variables;
    optimizing clustering of the design structure matrix through iterative steps of applying at least one genetic operator to a parent population of design structure matrix clusterings to generate an offspring population of design structure matrix clusterings until a first termination condition is met and an optimal clustering is defined;
    use said optimal clustering to create modules of variables; and,
    iteratively apply at least one genetic operator to selected ones of said modules of variables until a second termination condition is met.

27. A computer program product for creating modules of variables, the program product comprising computer executable instructions stored on a computer readable medium that when executed cause a computer to:
    organize the variables into a design structure matrix;
    create a parent population of design structure matrix clusterings;
    apply at least one genetic operator to said parent population of design structure matrix clusterings to produce an offspring population of design structure matrix clusterings;
    use a scoring metric to score said offspring population of design structure matrix clusterings;
    define an optimal clustering if a termination condition has been satisfied and if no termination condition has been satisfied perform a selection operation to create a new parent population and repeat the steps of applying at least one genetic operator and using a scoring metric until said termination condition has been achieved;
    use said optimal clustering to define modules of the variables; and,
    apply at least one genetic operator on a module-specific basis to selected ones of said modules to generate offspring modules.

28. A computer program product as defined by claim 27 wherein the program instructions when executed further cause the computer to:
    evaluate said offspring modules of said variables to determine if a second termination condition has been satisfied, and if no second termination condition has been satisfied to repeat the step of applying at least one genetic operator to selected ones of said modules on a module-specific basis to create new offspring modules until said second termination condition has been met.

* * * * *

UNITED STATES PATENT AND TRADEMARK OFFICE
CERTIFICATE OF CORRECTION

PATENT NO. : 7,280,986 B2
APPLICATION NO. : 10/774676
DATED : October 9, 2007
INVENTOR(S) : Goldberg et al.

It is certified that error appears in the above-identified patent and that said Letters Patent is hereby corrected as shown below:

<u>In the Specification:</u>

Col. 2, line 42  Please delete "(4c)" and insert --4(c)-- in its place.

Col. 7, line 57  Please delete "A" and insert --λ-- in its place.

Col. 10, line 23  Please delete "θ" and insert --$f$-- in its place.

Col. 10, line 26  Please delete two occurrences of "θ" and insert --$f$-- in each of the two places.

Col. 10, line 27  Please delete "θ" and insert --$f$-- in its place.

Col. 10, line 28  Please delete three occurrences of "θ" and insert --$f$-- in each of the three places.

Signed and Sealed this

Second Day of June, 2009

JOHN DOLL
*Acting Director of the United States Patent and Trademark Office*